United States Patent
Yun et al.

(10) Patent No.: US 8,670,097 B2
(45) Date of Patent: Mar. 11, 2014

(54) LIQUID CRYSTAL DISPLAY DEVICE AND METHOD OF DRIVING THE SAME

(75) Inventors: Sai-Chang Yun, Daegu (KR); Seung-Ho Heo, Gumi-si (KR); You-Sung Nam, Gwangmyeong-si (KR); Yong-Hwa Park, Gumi-si (KR); Dae-Seok Oh, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 542 days.

(21) Appl. No.: 12/979,906

(22) Filed: Dec. 28, 2010

(65) Prior Publication Data

US 2011/0249210 A1    Oct. 13, 2011

(30) Foreign Application Priority Data

Apr. 13, 2010 (KR) .................. 10-2010-0033883

(51) Int. Cl.
*G02F 1/136* (2006.01)
*G02F 1/1343* (2006.01)

(52) U.S. Cl.
USPC ............................. 349/139; 349/41

(58) Field of Classification Search
CPC .................................................. G09G 3/3655
See application file for complete search history.

(56) References Cited

U.S. PATENT DOCUMENTS 7,570,241 B2 *    8/2009    Kim et al. .................. 345/94

FOREIGN PATENT DOCUMENTS

CN                 101290438            10/2008

* cited by examiner

*Primary Examiner* — Michelle R Connelly
(74) *Attorney, Agent, or Firm* — McKenna Long & Aldridge, LLP

(57) ABSTRACT

A liquid crystal display device includes a plurality of pixels at intersections of a plurality of row lines and a plurality of column lines, wherein each pixel includes a switching transistor, and pixel and common electrodes that induce an in-plane electric field; a plurality of gate lines each connected to the pixels on each row line; a plurality of data lines each connected to the pixels on each column line; and a plurality of common lines each connected to the common electrodes of the pixels alternately located on neighboring two row lines per one column line.

15 Claims, 5 Drawing Sheets

LIQUID CRYSTAL DISPLAY DEVICE AND METHOD OF DRIVING THE SAME

The present invention claims the benefit of Korean Patent Application No. 10-2010-0033883, filed in Korea on Apr. 13, 2010, which is hereby incorporated by reference for all purposes as if fully set forth herein.

BACKGROUND OF THE INVENTION

1. Field of the Invention

The present invention relates to a liquid crystal display device, and more particularly, to a liquid crystal display (LCD) device, and a method of driving the same.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field. The LCD device using twisted nematic (TN) liquid crystal is referred to as a TN mode LCD device.

However, the TN mode LCD device has narrow viewing angles. To resolve this problem, an in-plane switching (IPS) mode LCD device is suggested.

FIG. 1 is a schematic view illustrating an IPS mode LCD device according to the related art.

Referring to FIG. 1, a liquid crystal panel 20 of the LCD device 10 includes gate lines GL1 to GL3 in a row direction, data lines DL1 to DL3 in a column direction, and common lines CL1 to CL3 in the row direction.

Pixels P are arranged in a matrix form and are connected to the corresponding gate, data and common lines GL1 to GL3, DL1 to DL3 and CL1 to CL3. The pixel P includes a switching transistor T, a liquid crystal capacitor Clc and a storage capacitor Cst. The switching transistor T is connected to the corresponding gate and data lines GL1, GL2 or GL3 and DL1, DL2 or DL3. The liquid crystal capacitor Clc and the storage capacitor Cst are connected to the switching transistor T. The liquid crystal capacitor Clc includes a pixel electrode, a common electrode, and a liquid crystal layer between the pixel and common electrodes. The pixel and common electrodes are formed in the same substrate, for example, an array substrate to induce an in-plane electric field, and thus liquid crystal molecules of the liquid crystal layer are driven by the in-plane electric field. The switching transistor T is formed in the array substrate where the pixel and common electrodes are formed. The storage capacitor Cst includes first and second storage electrodes.

The pixel electrode of the liquid crystal capacitor Clc and the first electrode of the storage capacitor Cst are connected to the switching transistor T. The common electrode of the liquid crystal capacitor Clc and the second electrode of the storage capacitor Cst are connected to the corresponding common line CL1, CL2 or CL3 to be supplied with a common voltage. The common lines CL1 to CL3 are connected together thus supplies the same common voltage to all the pixels P of the liquid crystal panel 20.

Gate voltage, for example, turn-on gate voltages are sequentially supplied to the gate lines GL1 to GL3. When the gate voltage is supplied, the switching transistor T of the pixel P connected to the corresponding gate line GL1, GL2 or GL3 is turned on and a data voltage is supplied to the pixel P through the corresponding data line DL1, DL2 or DL3. The data voltage is supplied to the pixel electrode and thus induces the in-plane electric field along with the common voltage of the common electrode.

The LCD device 10 is operated in an inversion driving method of alternating negative and positive polarities for the pixel P. The inversion driving method is categorized into a dot inversion method, a line inversion method, a frame inversion method and the like. Among these methods, the dot inversion method is widely used.

The dot inversion method is to invert a polarity of the pixel P per pixel and per frame. In other words, neighboring pixels have opposite polarities, and each pixel has opposite polarities per frame. The dot inversion method has advantage of preventing flicker and crosstalk more effectively than other inversion methods.

FIG. 2 is a view illustrating waveform of a data voltage and a common voltage of the LCD device operated in a dot inversion method according to the related art.

Referring to FIG. 2, a common voltage Vcom are maintained at a predetermined level. A data voltage Vdata applied to a pixel changes in polarity with respect to the common voltage Vcom per frame F. For example, the data voltage Vdata has a negative polarity for a frame while the data voltage Vdata has a positive polarity for a next frame, and this polarity inversion is repeated.

However, since the data voltage Vdata applied to the pixel swings with respect to the common voltage Vcom of the constant voltage level, the swing width of the data voltage Vdata is great. This causes increase of power consumption of the LCD device.

SUMMARY OF THE INVENTION

Accordingly, the present invention is directed to a liquid crystal display device and a method of driving the same that substantially obviates one or more of the problems due to limitations and disadvantages of the related art.

An advantage of the present invention is to provide a liquid crystal display device and a method of driving the same that can reduce power consumption and improve display quality.

Additional features and advantages of the present invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes a plurality of pixels at intersections of a plurality of row lines and a plurality of column lines, wherein each pixel includes a switching transistor, and pixel and common electrodes that induce an in-plane electric field; a plurality of gate lines each connected to the pixels on each row line; a plurality of data lines each connected to the pixels on each column line; and a plurality of common lines each connected to the common electrodes of the pixels alternately located on neighboring two row lines per column line.

In another aspect, a method of driving a liquid crystal display device, the liquid crystal display device including a plurality of pixels at intersections of a plurality of row lines and a plurality of column lines, wherein each pixel includes a switching transistor, and pixel and common electrodes that induce an in-plane electric field, the method includes sequentially supplying a plurality of gate voltages to a plurality of gate lines that are each connected to the pixels on each row line; supplying a plurality of data voltages to a plurality of data lines, that are each connected to the pixels on each column line, in synchronization with each gate voltage; and sequentially supplying a plurality of common voltages to a plurality of common lines, that are each connected to the common electrodes of the pixels alternately located on neighboring two row lines per column line, with polarity inversion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to illustrated embodiments of the present invention, which are illustrated in the accompanying drawings.

Figure 1:
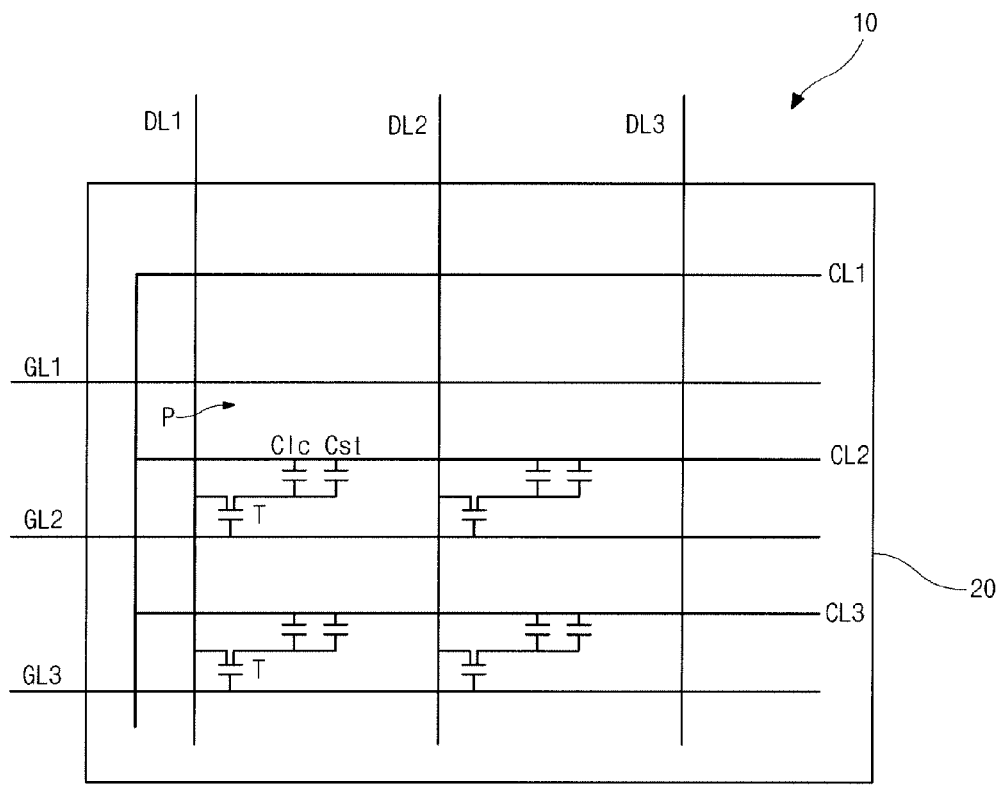
FIG. 1 is a schematic view illustrating an IPS mode LCD device according to the related art.
Figure 2:
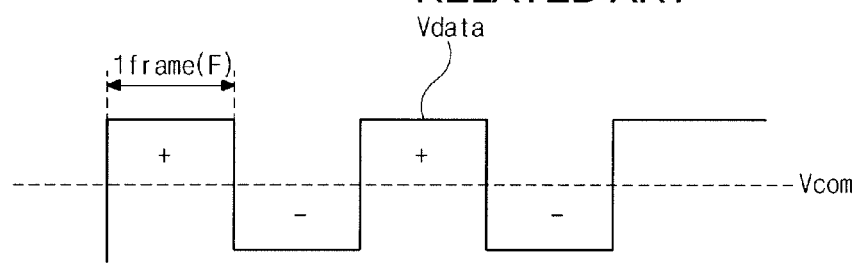
FIG. 2 is a view illustrating waveform of a data voltage and a common voltage of the LCD device operated in a dot inversion method according to the related art.
Figure 3:
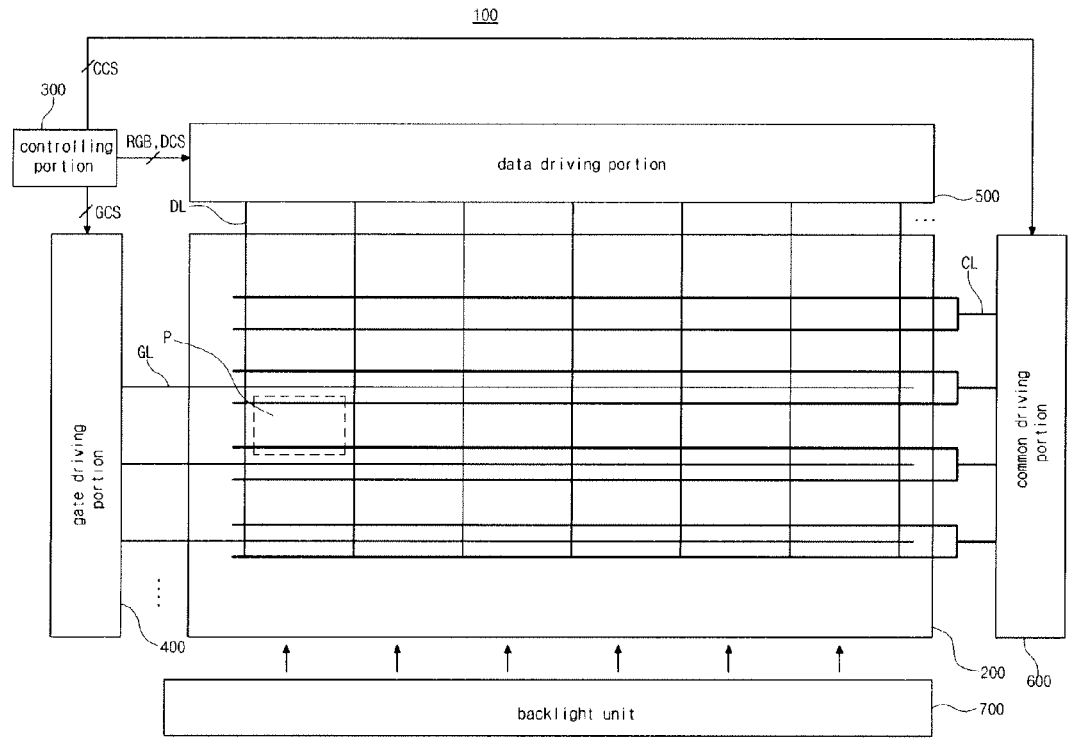
FIG. 3 is a schematic view illustrating an LCD device according to a first embodiment of the present invention.
Figure 4:
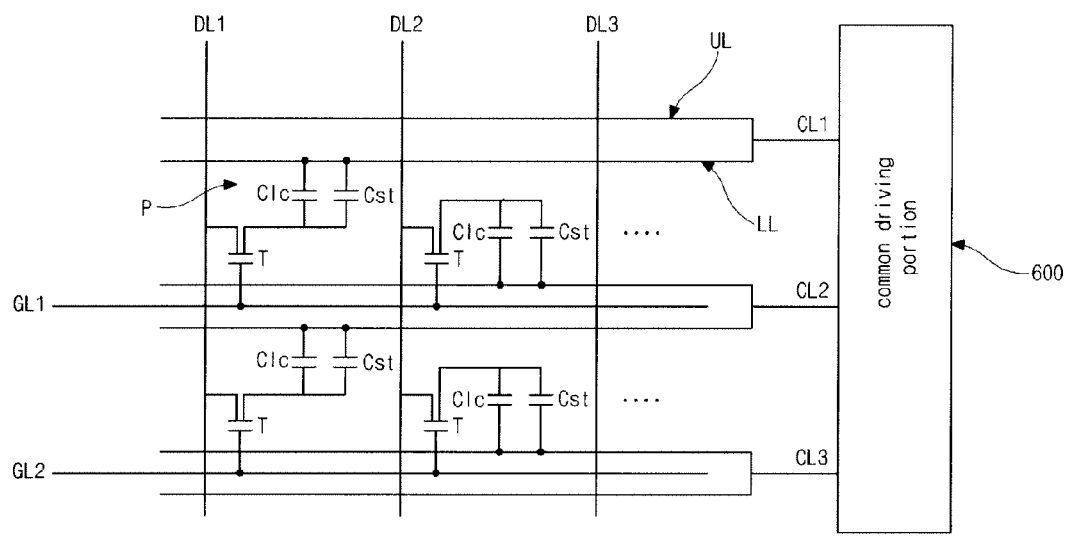
FIG. 4 is a schematic view illustrating a liquid crystal panel and a common driving portion of the LCD device according to the first embodiment of the present invention.

FIG. 3 is a schematic view illustrating an LCD device according to a first embodiment of the present invention, and FIG. 4 is a schematic view illustrating a liquid crystal panel and a common driving portion of the LCD device according to the first embodiment of the present invention.

Referring to FIGS. 3 and 4, the LCD device 100 includes a liquid crystal panel 200 displaying images, a backlight unit 700 supplying light to the liquid crystal panel 200, and a driving circuit operating the liquid crystal panel 200. The driving circuit includes a controlling portion 300, a gate driving portion 400, a data driving portion 500, and a common driving portion 600. The LCD device 100 of the embodiment is an IPS mode LCD device.

The liquid crystal panel 200 includes an array substrate and an opposing substrate facing each other and a liquid crystal layer between the two substrates. The liquid crystal panel 200 also includes a plurality of gate lines GL along a first direction, for example, a row direction, a plurality of data lines DL along a second direction, for example, a column direction, and a plurality of common lines CL along the first direction. A plurality of pixels P are arranged in a matrix form and connected to the corresponding gate, data and common lines GL, DL and CL.

The pixel P includes a switching transistor T, a liquid crystal capacitor Clc and a storage capacitor Cst. The switching transistor T is connected to the corresponding gate and data lines GL and DL. The liquid crystal capacitor Clc and the storage capacitor Cst are connected to the switching transistor T. The liquid crystal capacitor Clc includes a pixel electrode, a common electrode, and the liquid crystal layer between the pixel and common electrodes. The pixel and common electrodes are formed in the same substrate, for example, the array substrate to induce an in-plane electric field, and thus liquid crystal molecules of the liquid crystal layer are driven by the in-plane electric field. The switching transistor T is formed in the array substrate where the pixel and common electrodes are formed. The storage capacitor Cst includes first and second storage electrodes.

The pixel electrode of the liquid crystal capacitor Clc and the first electrode of the storage capacitor Cst are connected to the switching transistor T. The common electrode of the liquid crystal capacitor Clc and the second electrode of the storage capacitor Cst are connected to the corresponding common line CL to be supplied with the corresponding common voltage.

Gate voltage, for example, turn-on gate voltages are sequentially supplied to the gate lines GL. When the gate voltage is supplied, the switching transistor T of the pixel P connected to the corresponding gate line GL is turned on and a data voltage is supplied to the pixel through the corresponding data line DL. The data voltage is supplied to the pixel electrode and thus induces the in-plane electric field with the common voltage of the common electrode. The storage capacitor Cst functions to store the data voltage when the switching transistor T is turned off.

The backlight unit 700 is below the liquid crystal panel 200 and supplies light to the liquid crystal panel 200. A cold cathode fluorescent lamp (CCFL), an external electrode fluorescent lamp (EEFL) or a light emitting diode (LED) may be used for the backlight unit 700.

The controlling portion 300 generates control signals, for example, a gate control signal GCS to control the gate driving portion 400, a data control signal DCS to control the data driving portion 500, and a common control signal CCS to control the common driving portion 600. The controlling portion 300 is supplied with data signals RGB from an external system, and transfer the data signals RGB to the data driving portion 500.

The data driving portion 500 outputs data voltages to the corresponding data lines DL in response to the data signals RGB and the data control signal DCS.

The gate driving portion 400 outputs the gate voltages to the corresponding gate lines GL in response to the gate control signal GCS. The gate driving portion 400 may be fabricated in a IC type and connected to the liquid crystal panel 200, or may be directly formed in the liquid crystal panel 200, for example, the array substrate. When the gate driving portion 400 is directly formed in the liquid crystal panel 200, this type liquid crystal panel may be referred to as a GIP (gate in panel) type liquid crystal panel. In the GIP type liquid crystal panel, the gate driving portion 400 may be formed during processes of forming an array element such as the gate and data lines GL and DL, the switching transistor T and the like.

The common driving portion 600 outputs the common voltages to the corresponding common lines CL.

The common line CL may be connected to the pixels P that are alternately located on the neighboring two row lines per column line. For example, a second common line CL2 is connected to the pixels P on odd column lines (or even column lines) among the pixels P on a first row line and is connected to the pixels P on even column lines (or odd column lines) among the pixels P on a second row line. On the other hand, the first common line CL1 is connected to the pixels P, not connected to the second common line CL2, among the pixels P on the first row line. In similar, the last common line (e.g., a $(n+1)^{th}$ common line) is connected to pixels, not connected to the last but one common line (e.g., a $n^{th}$ common line), among the pixels P on the last row line (e.g., a $n^{th}$ row line).

In the above-described manner, connection of the common lines CL and the pixels P can be made.

The common line CL may include first and second sub-lines UL and LL. For example, the common line CL branches off into the first and second sub-lines UL and LL, and thus the first and second sub-lines UL and LL are supplied together with the corresponding common voltage from the common driving portion 600. This structure may be referred to as a single feeding structure.

The first and second sub-lines UL and LL may be called as previous and next sub-lines UL and LL, respectively. The first sub-line UL may be connected to pixels P on a previous row line among neighboring two row lines while the second sub-line LL may be connected to pixels P on a next row line among the neighboring two row lines. For example, the first sub-line UL of the second common line CL2 is connected to the pixels P on the first row line while the second sub-line LL of the second common line CL2 is connected to the pixels P on the second row line.

The first and second sub-lines UL and LL may be connected to each other at one ends thereof. For example, the one ends of the first and second sub-lines UL and LL are connected to each other at a region that is opposite to a region where the gate driving portion 400 are located. In this case, the connection portion of the first and second sub-lines UL and LL (i.e., the branch-off portion of the common line CL) may be located outside or inside the liquid crystal panel 200.

Alternatively, the connection portion of the first and second sub-lines UL and LL (i.e., the branch-off portion of the common line CL) may be located at the region where the gate driving portion 400 is located, and in this case, the common driving portion 600 may be located at the region where the gate driving portion 400 is located.

It is preferred that the common line CL does not overlap the gate line GL. In more detail, the gate line GL may extend between the first and second sub-lines UL and LL of the corresponding common line CL and be in parallel with the first and second sub-lines UL and LL, and the connection portion of the first and second sub-lines UL and LL may be spaced apart from one end of the gate line GL. In this case, a capacitive coupling between the gate line GL and the common line CL due to overlapping therebetween can be prevented. Accordingly, distortion of the common voltage can be effectively reduced, and the common driving portion 600 can stably supply the common voltage to the corresponding common line CL.

In the embodiment, a top common line and a bottom common line may have a structure different from that of other common lines. For example, the top common line and the bottom common line may have not a double sub-line structure but a single sub-line structure. Furthermore, the top common line is connected to the common electrodes of the pixels connected to the top common line and on a top row line of the plurality of gate lines, and the bottom common line is connected to the common electrodes of the pixels connected to the bottom common line and on a bottom row line of the plurality of gate lines.

Figure 5:
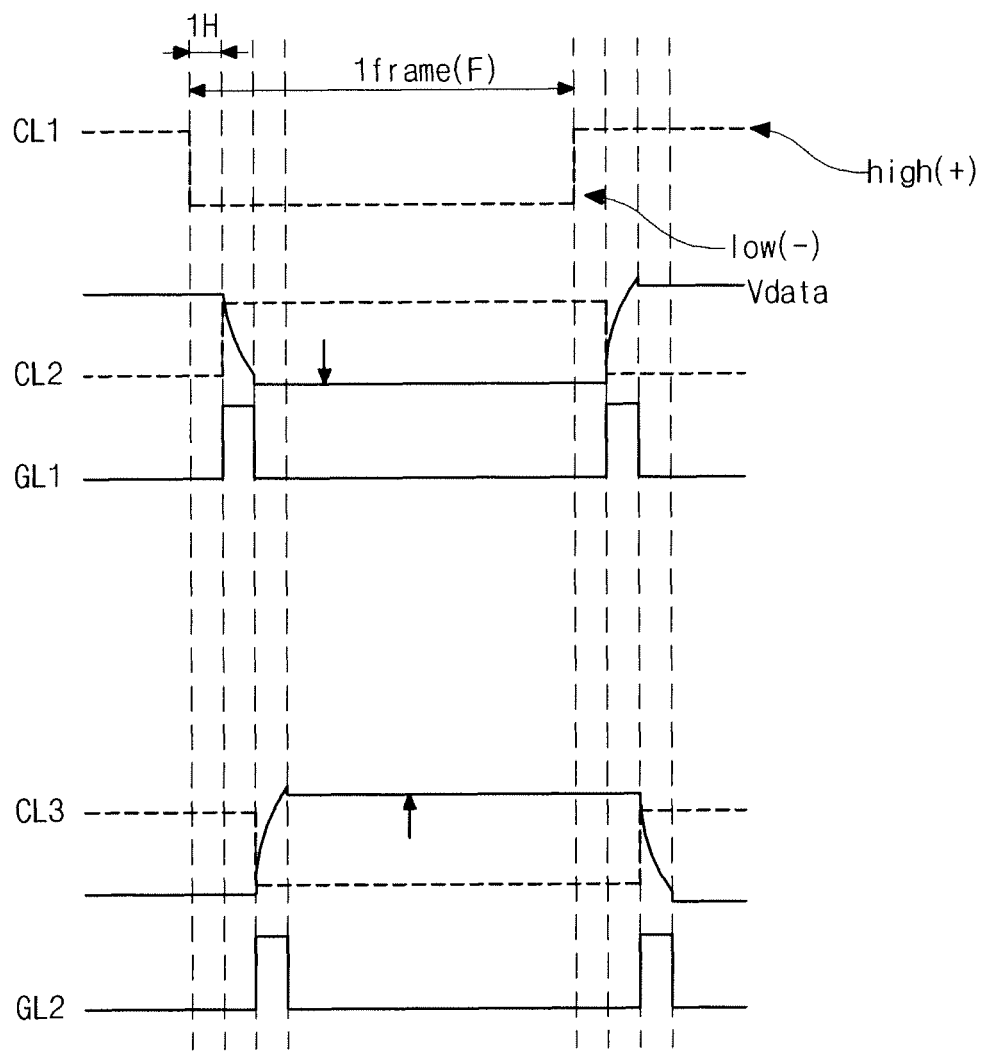
FIG. 5 is a timing chart of signals to operate the LCD device according to the first embodiment.
Figure 6:
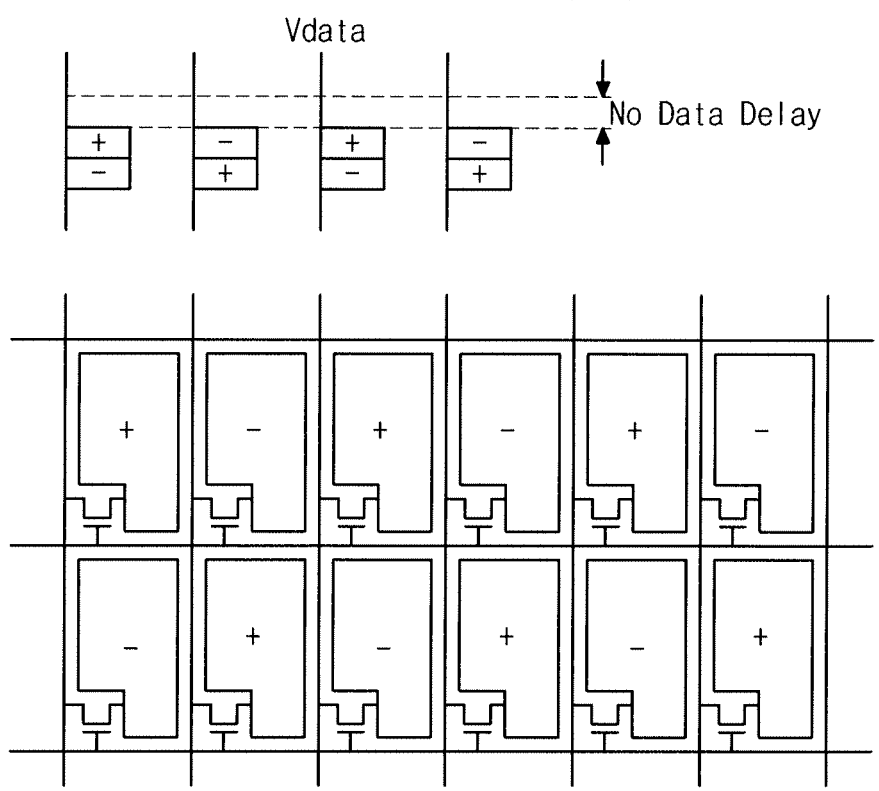
FIG. 6 is a view illustrating polarities of data voltages and pixels in the LCD device operated in a dot inversion method according to the first embodiment.

A method of driving the LCD device of the embodiment is explained further with reference with FIGS. 5 and 6.

FIG. 5 is a timing chart of signals to operate the LCD device according to the first embodiment, and FIG. 6 is a view illustrating polarities of data voltages and pixels in the LCD device operated in a dot inversion method according to the first embodiment.

Referring to FIG. 5, gate voltages are sequentially outputted to the gate lines GL1 to GL2 to turn on the switching transistors T, and a data voltage Vdata is outputted to the data line DL in synchronization with the output of the gate voltage. The gate voltage is substantially supplied to the corresponding gate line GL for a horizontal period H.

A level of a common voltage Vcom is inverted in synchronization with the output of the corresponding gate voltage. In more detail, when a $n^{th}$ gate line is supplied with the gate voltage, a level of the common voltage Vcom outputted to a $(n+1)^{th}$ common line is changed between high and low. The high and low levels may be referred to as a positive polarity and a negative polarity, respectively. For example, when the gate voltage is outputted to the first gate line GL1, the level of the common voltage Vcom of the second common line CL2 is inverted from negative (−) to positive (+).

The common voltages Vcom are sequentially outputted to the common lines CL at an interval of one horizontal period H, and the common voltages Vcom of the neighboring common lines CL are different in polarity. For example, at one horizontal period H after the polarity of the common voltage Vcom of the first common line CL1 is inverted from positive (+) to negative (−), the polarity of the common voltage Vcom of the second common line CL2 is inverted from negative (−) to positive (+). Further, at one horizontal period H after the polarity of the common voltage Vcom of the second common line CL2 is inverted, the polarity of the common voltage Vcom of a third common line CL3 is inverted from positive (+) to negative (−).

Further, the common voltage Vcom of each common line CL is inverted per predetermined period, for example, one frame F.

Further, the data voltage Vdata has a level (i.e., polarity) opposite to the level (i.e., polarity) of the common voltage Vcom of the corresponding common line CL. For example, the data voltage Vdata has a high level (i.e., positive polarity) when the common voltage Vcom of the common line CL connected to the pixel supplied with the data voltage Vdata has a low level (i.e., negative polarity).

Through the above-described explanations, the LCD device of the embodiment is operated in a dot inversion method, as shown in FIG. 6.

In the above embodiment, the common driving portion 600 sequentially outputs the common voltages Vcom with level (i.e., polarity) inversion to the corresponding common lines CL. Accordingly, a capacitive coupling due to the level inversion of the common voltage Vcom is substantially uniform all over the liquid crystal panel 200 irrespective of vertical positions. Therefore, gradual brightness difference along a vertical direction due to a non-uniform capacitive coupling can be prevented.

Further, since the LCD device 100 is operated in a dot inversion method, display quality can be improved. For example, when the LCD device is operated in a line inversion method, this causes problems such as a line flicker, a horizontal dim, a horizontal crosstalk and the like. These problems can be prevented because of operating the LCD device 100 in a dot inversion method.

Further, the level of the data voltage Vdata is opposite to the level of the corresponding common voltage Vcom. This reduces the swing width of the data voltage Vdata outputted from the data driving portion 500. Therefore, power consumption can be reduced.

Figure 7:
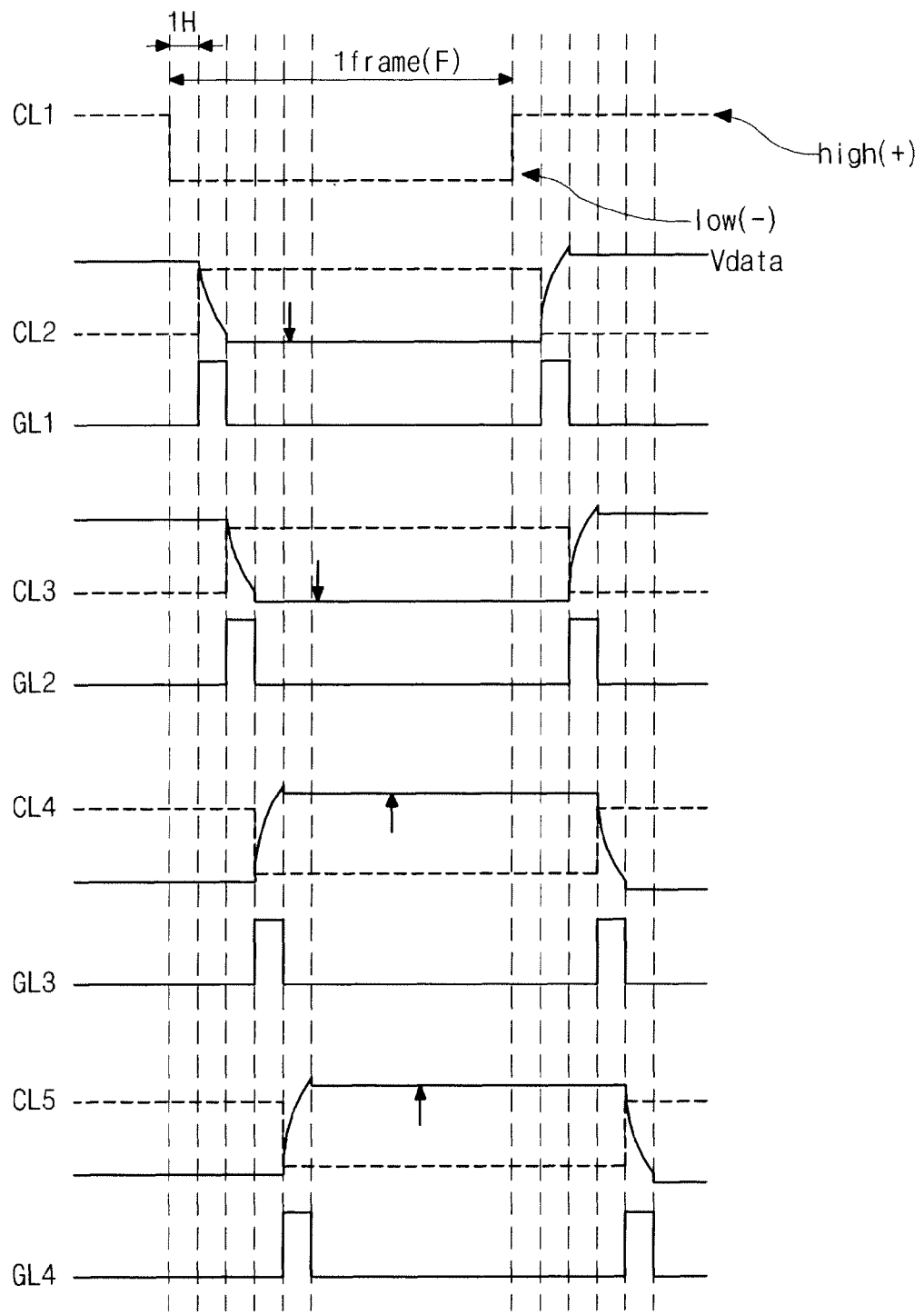
FIG. 7 is a timing chart of signals to operate an LCD device in a vertical 2(two)-dot inversion method according to a second embodiment.

FIG. 7 is a timing chart of signals to operate an LCD device in a vertical 2(two)-dot inversion method according to a second embodiment. The LCD device of the second embodiment is similar to that of the first embodiment except for the inversion driving method. Accordingly, explanations of parts similar to parts of the first embodiment may be omitted.

Referring to FIG. 7, the vertical 2-dot inversion method is to invert polarities of pixels along a column line per 2 pixels. To do this, a direction of level (i.e., polarity) inversion of the common voltage is changed per two common lines. For example, the common voltages of second and third common lines CL2 and CL3 have the same level inversion direction (e.g., from a low level to a high level) while the common voltages of fourth and fifth common lines CL4 and CL5 have the same level inversion direction (e.g., from a high level to a low level) that is opposite to the level inversion direction of the common voltages of the second and third common lines CL2 and CL3.

A data voltage has a level (i.e., polarity) opposite to a level of the corresponding common voltage.

When the LCD device is operated in the vertical 2-dot inversion method, power consumption and heat generation can be further reduced.

In the above embodiments, the dot-inversion and vertical 2-dot inversion methods are mainly explained. However, it should be understood that other type inversion methods may be employed. For example, a vertical 3(three) or more-dot inversion methods may be used to operate the LCD device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a plurality of pixels at intersections of a plurality of row lines and a plurality of column lines, wherein each pixel includes a switching transistor, and pixel and common electrodes that induce an in-plane electric field;
   a plurality of gate lines each connected to the pixels on each row line;
   a plurality of data lines each connected to the pixels on each column line; and
   a plurality of common lines each of which is alternately connected to the common electrodes of the pixels on a first row line of neighboring two row lines, and to the common electrode of the pixels on a second row line of the neighboring two row lines,
   wherein the common line includes a first sub-line connected to the common electrodes of the pixels on the first row line among the neighboring two row lines, and a second sub-line connected to the common electrodes of the pixels on the second row line among the neighboring two row lines.

2. The device according to claim 1, wherein the gate line is between the first and second sub-lines.

3. The device according to claim 2, wherein the common line comprises a branch-off portion, where the common line branches off into the first and second sub-lines.

4. The device according to claim 1, wherein a common voltage supplied to one of the common lines is in synchronization with a corresponding gate voltage supplied to the gate line connected to the pixels.

5. The device according to claim 1, wherein a common voltage supplied to one of the common lines is in synchronization with a corresponding gate voltage supplied to the gate line connected to the pixels on the first row line among the neighboring two row lines.

6. The device according to claim 1, wherein a top common line of the plurality of common lines is connected to the common electrodes of the pixels connected to the top common line and on a top row line of the plurality of gate lines.

7. The device according to claim 1, wherein a bottom common line of the plurality of common lines is connected to the common electrodes of the pixels connected to the bottom common line and on a bottom row line of the plurality of gate lines.

8. A method of driving a liquid crystal display device, the liquid crystal display device including a plurality of pixels at intersections of a plurality of row lines and a plurality of column lines, wherein each pixel includes a switching transistor, and pixel and common electrodes that induce an in-plane electric field, the method comprising steps of:
   sequentially supplying a plurality of gate voltages to a plurality of gate lines that are each connected to the pixels on each row line;
   supplying a plurality of data voltages to a plurality of data lines, that are each connected to the pixels on each column line, in synchronization with each corresponding gate voltage; and
   sequentially supplying a plurality of common voltages to a plurality of common lines each of which is alternately connected to the common electrodes of the pixels on a first row line of neighboring two row lines, and to the common electrode of the pixels on a second row line of the neighboring two row lines, with polarity inversion,
   wherein the common line includes a first sub-line connected to the common electrodes of the pixels on the first row line among the neighboring two row lines, and a second sub-line connected to the common electrodes of the pixels on the second row line among the neighboring two row lines.

9. The method according to claim 8, wherein the common voltage of the common line is in synchronization with the gate voltage of the gate line connected to the pixels on the first row line among the neighboring two row lines.

10. The method according to claim 8, wherein the gate line is between the first and second sub-lines.

11. The method according to claim 10, wherein the common line comprises a branch-off portion, where the common line branches off into the first and second sub-lines.

12. The method according to claim 8, wherein a common voltage supplied to one of the common lines is in synchronization with a corresponding gate voltage supplied to the gate line connected to the pixels.

13. The method according to claim 8, wherein a common voltage supplied to one of the common lines is in synchronization with a corresponding gate voltage supplied to the gate line connected to the pixels on the first row line among the neighboring two row lines.

14. The method according to claim 8, wherein a top common line of the plurality of common lines is connected to the common electrodes of the pixels connected to the top common line and on a top row line of the plurality of gate lines.

15. The method according to claim 8, wherein a bottom common line of the plurality of common lines is connected to the common electrodes of the pixels connected to the bottom common line and on a bottom row line of the plurality of gate lines.

* * * * *